(12) United States Patent
Tamura

(10) Patent No.: US 8,031,130 B2
(45) Date of Patent: Oct. 4, 2011

(54) DISPLAY DRIVER AND ELECTRONIC INSTRUMENT

(75) Inventor: Tsuyoshi Tamura, Hara (JP)

(73) Assignee: Seiko Epson Corporation (JP)

( * ) Notice: Subject to any disclaimer, the term of this patent is extended or adjusted under 35 U.S.C. 154(b) by 969 days.

(21) Appl. No.: 11/385,944

(22) Filed: Mar. 21, 2006

(65) Prior Publication Data

US 2006/0214902 A1    Sep. 28, 2006

(30) Foreign Application Priority Data

Mar. 28, 2005   (JP) ................................. 2005-092114

(51) Int. Cl.
*G09G 5/00*   (2006.01)
(52) U.S. Cl. ........................................ 345/1.1; 710/104
(58) Field of Classification Search ................... 345/204, 345/1.1–3.2, 87, 103; 710/104–125
See application file for complete search history.

(56) References Cited

U.S. PATENT DOCUMENTS

| | | | | |
|---|---|---|---|---|
| 5,999,214 A | * | 12/1999 | Inagaki | 348/211.12 |
| 6,023,252 A | * | 2/2000 | Yano et al. | 345/1.1 |
| 6,356,260 B1 | * | 3/2002 | Montalbo | 345/204 |
| 6,657,622 B2 | * | 12/2003 | Park | 345/205 |
| 2002/0011998 A1 | * | 1/2002 | Tamura | 345/204 |
| 2004/0058714 A1 | | 3/2004 | Sawamura | |
| 2004/0160242 A1 | * | 8/2004 | Rahman | 326/83 |
| 2004/0260850 A1 | * | 12/2004 | Yu et al. | 710/104 |
| 2006/0250356 A1 | | 11/2006 | Sawamura | |

FOREIGN PATENT DOCUMENTS

| | | | |
|---|---|---|---|
| JP | 04-133153 | | 5/1992 |
| JP | 2001092767 A | * | 4/2001 |
| JP | 2001-222249 | | 8/2001 |
| JP | 2002-108486 | | 4/2002 |
| JP | 2004-088750 | | 3/2004 |

* cited by examiner

*Primary Examiner* — Amare Mengistu
*Assistant Examiner* — Vinh Lam
(74) *Attorney, Agent, or Firm* — Harness, Dickey & Pierce, P.L.C.

(57) ABSTRACT

A display driver comprising: a high-speed serial interface circuit which receives a packet from a host device through a high-speed serial bus using differential signals, and outputs a command or data included in the received packet; a driver circuit which drives a main display panel based on the output command or data; and a low-speed serial interface circuit which outputs a command or data to a sub display driver through a low-speed serial bus when the packet received from the host device includes the sub display driver command or data. And the display driver inserts dummy data to the packet to adjust the difference of the transfer rate by inserting a dummy the dummy data. And the display driver adjust the difference of the transfer rate.

25 Claims, 11 Drawing Sheets

DISPLAY DRIVER AND ELECTRONIC INSTRUMENT

Japanese Patent Application No. 2005-92114, filed on Mar. 28, 2005, is hereby incorporated by reference in its entirety.

BACKGROUND OF THE INVENTION

The present invention relates to a display driver and an electronic instrument.

In recent years, a high-speed serial transfer interface such as a low voltage differential signaling (LVDS) interface has attracted attention as an interface aiming at reducing EMI noise or the like. In such a high-speed serial transfer, data is transferred by causing a transmitter circuit to transmit serialized data using differential signals and causing a receiver circuit to differentially amplify the differential signals (JP-A-2001-222249).

An ordinary portable telephone includes a first instrument section provided with buttons for inputting a telephone number or a character, a second instrument section provided with a main liquid crystal display (LCD), a sub LCD, or a camera, and a connection section (e.g. hinge) which connects the first and second instrument sections. The number of interconnects passing through the connection section can be reduced by transferring data between a first substrate of the first instrument section and a second substrate of the second instrument section by serial transfer using differential signals.

A sub LCD is generally provided in the second instrument section of a portable telephone in addition to a main LCD. It is desirable that the sub LCD be controlled by a display driver which drives the main LCD in order to reduce the number of parts of the portable telephone.

A host device (e.g. MPU, baseband engine, or display controller) provided in the first instrument section transfers data at high speed through a high-speed serial bus. The operation speed of a sub display driver which drives the sub LCD is generally lower than that of the display driver for the main LCD. Therefore, if the data transferred from the host device through the high-speed serial bus is directly output to the sub display driver, there may be a case where the sub display driver cannot receive the data.

SUMMARY

A first aspect of the invention relates to a display driver comprising:
a high-speed serial interface circuit which receives a packet from a host device through a high-speed serial bus using differential signals, and outputs a command or data included in the received packet;
a driver circuit which drives a main display panel based on the command or the data output from the high-speed serial interface circuit; and
a low-speed serial interface circuit which outputs a sub display driver command or data to a sub display driver through a low-speed serial bus of which a transfer rate is lower than a transfer rate of the high-speed serial bus when the packet received from the host device includes the sub display driver command or data.

A second aspect of the invention relates to an electronic instrument comprising:
the above display driver;
the host device connected with the display driver through the high-speed serial bus;
the main display panel driven by the display driver; and
the sub display panel connected with the display driver through the low-speed serial bus.

DETAILED DESCRIPTION OF THE EMBODIMENT

Figure 1:
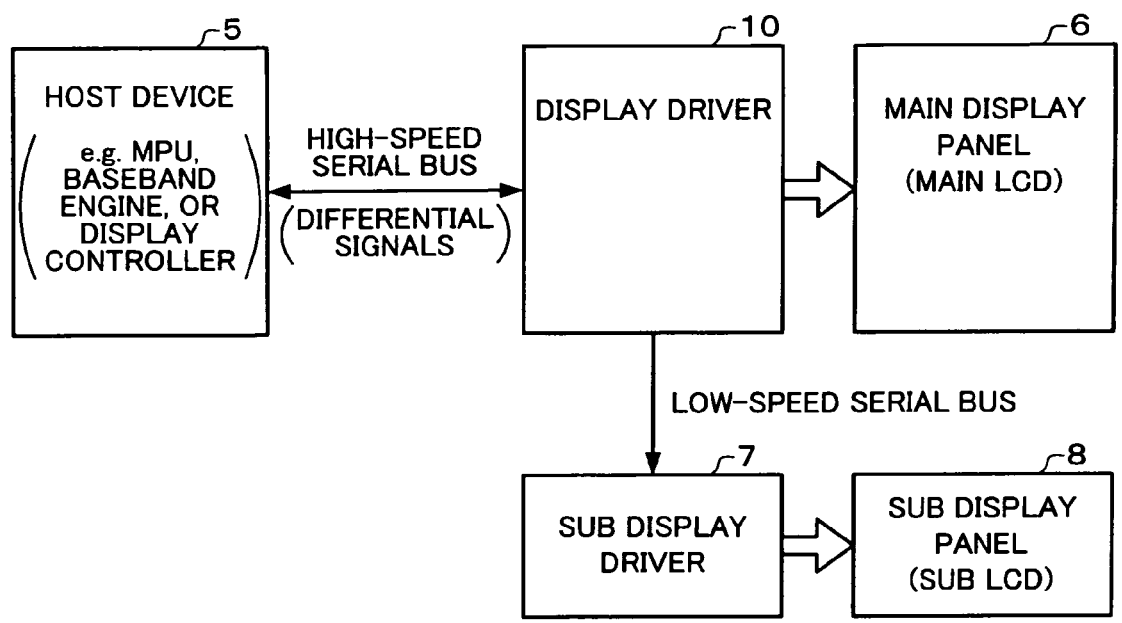
FIG. 1 is a configuration example of an electronic instrument including a display driver according to one embodiment of the invention.

The invention may provide a display driver which enables efficient control of a sub display driver which drives a sub display panel, and an electronic instrument including the same.

One embodiment of the invention provides a display driver comprising:
a high-speed serial interface circuit which receives a packet from a host device through a high-speed serial bus using differential signals, and outputs a command or data included in the received packet;
a driver circuit which drives a main display panel based on the command or the data output from the high-speed serial interface circuit; and
a low-speed serial interface circuit which outputs a sub display driver command or data to a sub display driver through a low-speed serial bus of which a transfer rate is lower than a transfer rate of the high-speed serial bus when the packet received from the host device includes the sub display driver command or data.

According to one embodiment of the invention, the packet is received through the high-speed serial bus. When the received packet includes the sub display driver command or data, the command or data is serially output to the sub display driver through the low-speed serial bus. This enables the command or data transferred from the host device through the high-speed serial bus to be transferred to the sub display driver without providing a high-speed serial interface circuit or the like in the sub display driver, whereby the sub display driver can be efficiently controlled.

With this embodiment,
the high-speed serial interface circuit may receive a packet in which the sub display driver data and transfer rate adjustment dummy data are set in a data field; and
the low-speed serial interface circuit may output the sub display driver data to the sub display driver from the sub display driver data and the dummy data set in the data field of the received packet.

This enables the difference in transfer rate between the high-speed serial bus and the low-speed serial bus to be automatically adjusted, so that the sub display driver data can be output to the low-speed serial bus at low speed.

With this embodiment, when the transfer rate of the high-speed serial bus is indicated by VH and the transfer rate of the low-speed serial bus is indicated by VL, the high-speed serial interface circuit may receive a packet in which the dummy data of which a number of bytes is increased as a ratio "VL/VH" becomes smaller is set in the data field.

This makes it possible to set an optimum number of bytes of dummy data corresponding to the ratio of the transfer rate of the high-speed serial bus and the transfer rate of the low-speed serial bus in the data field of the packet.

This embodiment may comprise an extraction circuit which extracts the sub display driver data from the sub display driver data and the dummy data set in the data field of the received packet.

This enables only the sub display driver data to be extracted while excluding the dummy data set in the data field of the packet.

With this embodiment, the high-speed serial interface circuit may receive a packet in which the sub display driver command is set in a header field; and the low-speed serial interface circuit may output the sub display driver command set in the header field of the received packet to the sub display driver.

This enables the sub display driver command to be efficiently transferred to the sub display driver.

With this embodiment, the high-speed serial interface circuit may receive a packet including destination information for designating a destination of the command or the data from the host device; and when the sub display driver has been designated as the destination by the destination information, the low-speed serial interface circuit may output the command or the data from the high-speed serial interface circuit to the sub display driver as the sub display driver command or data.

This enables the data or command included in the packet to be automatically classified and transferred to the driver circuit (main) or the low-speed serial interface circuit (sub).

This embodiment may comprise a command register into which the command included in the received packet is written, and when a command which enables output of the command or the data to the sub display driver has been written into the command register, the low-speed serial interface circuit may output the command or the data from the high-speed serial interface circuit to the sub display driver as the sub display driver command or data.

With this embodiment, the high-speed serial interface circuit may outputs host interface signals including a signal of the command or the data included in the received packet as a parallel data signal; and the driver circuit may include:

a host interface circuit which receives the host interface signals from the high-speed serial interface circuit and outputs the parallel data signal included in the host interface signals; and an output switch circuit which receives the parallel data signal from the host interface circuit and outputs the parallel data signals to one of an internal circuit of the driver circuit and the low-speed serial interface circuit.

This enables the sub display driver command or data to be transferred to the low-speed serial interface circuit by effectively utilizing the host interface circuit included in the driver circuit.

With this embodiment, the high-speed serial interface circuit may include a chip select signal generation circuit which generates and outputs a second chip select signal separately from a first chip select signal included in the host interface signals; and the output switch circuit may output the parallel data signal from the host interface circuit to one of the internal circuit of the driver circuit and the low-speed serial interface circuit based on the second chip select signal.

This enables the sub display driver command or data to be transferred to the low-speed serial interface circuit by merely generating the second chip select signal.

With this embodiment, the high-speed serial interface circuit may output a signal of the command or the data included in the received packet to the driver circuit as a parallel data signal; and the low-speed serial interface circuit may include a parallel/serial conversion circuit which converts the parallel data signal to a serial data signal.

This enables the sub display driver command or data to be transferred to the low-speed serial interface circuit by effectively utilizing the parallel data signal output to the driver circuit.

With this embodiment, the high-speed serial interface circuit may receive differential strobe signals or differential clock signals from the host device as the differential signals; and the low-speed serial interface circuit may output the sub display driver command or data to the sub display driver based on a clock signal generated by dividing a frequency of a clock signal obtained by the differential strobe signals or the differential clock signals.

This prevents occurrence of a problem such as a change in the display position in the sub display panel.

With this embodiment, the low-speed serial interface circuit may output command/data identification information for identifying the command or the data to the sub display driver while associating the command/data identification information with the sub display driver command or data.

With this embodiment, the high-speed serial bus may be a serial bus using low amplitude differential signals; and the low-speed serial bus may be a serial bus using a signal at a CMOS voltage level.

Another embodiment of the invention provide electronic instrument comprising:

one of the above display drivers;

the host device connected with the display driver through the high-speed serial bus;

the main display panel driven by the display driver; and the sub display panel connected with the display driver through the low-speed serial bus.

Note that the embodiments described hereunder do not in any way limit the scope of the invention defined by the claims laid out herein. Note also that not all of the elements of these embodiments should be taken as essential requirements to the means of the present invention.

1. Electronic Instrument

FIG. 1 shows an example of an electronic instrument (electro-optical device) including a display driver 10 according to one embodiment of the invention. The electronic instrument may include constituent elements (e.g. camera, operation section, or power supply circuit) other than the constituent elements shown in FIG. 1. The electronic instrument according to one embodiment of the invention is not limited to a portable telephone, and may be a digital camera, PDA, electronic notebook, electronic dictionary, portable information terminal, or the like.

In FIG. 1, a host device 5 is a micro processor unit (MPU), a baseband engine (baseband processor), a display controller (image processing controller), or the like. The host device 5 (host processor) controls the display driver 10. The host device 5 may perform processing as an application engine or a baseband engine or processing as a graphic engine such as compression, decompression, and sizing.

A main display panel 6 and a sub display panel 8 include a plurality of data lines (signal lines), a plurality of scan lines, and a plurality of pixels specified by the data lines and the scan lines. A display operation is realized by changing the optical properties of an electro-optical element (liquid crystal element in a narrow sense) in each pixel area.

The main display panel 6 is a panel larger (panel having a larger number of display pixels) than the sub display panel 8. The main display panel 6 may be formed by an active matrix type panel using a switching element (two terminal type nonlinear element) such as a thin film transistor (TFT) or a thin film diode (TFD). The sub display panel 8 may be formed by a simple matrix type panel using a super twisted nematic (STN) liquid crystal or the like. The sub display panel 8 may also be formed by an active matrix type panel using a TFT or a TFD. Or, the main display panel 6 or the sub display panel 8 may be a panel (e.g. organic EL panel) other than a liquid crystal panel.

The display driver 10 drives the data lines (source lines) and the scan lines (gate lines) of the main display panel 10. The display driver 10 may drive only the data lines. A sub display driver 7 (sub display panel driver) drives the data lines (segment lines) and the scan lines (common lines) of the sub display panel 8. The display driver 10 and the sub display driver 7 may be formed by one chip (semiconductor chip).

In FIG. 1, the host device 5 and the display driver 10 are connected through a high-speed serial bus using differential signals. The high-speed serial bus is a serial bus (LVDS) using low amplitude (e.g. 500 mV) differential signals (differential data signals, differential strobe signals, and differential clock signals). The host device 5 and the display driver 10 transfer packets through the serial bus using differential signals. In more detail, the host device 5 and the display driver 10 transfer packets by current-driving or voltage-driving differential signal lines of the serial bus. As the high-speed serial bus interface, an interface conforming to the mobile display digital interface (MDDI) standard or the like may be used. The differential signal lines of the high-speed serial bus may have a multi-channel configuration.

The display driver 10 and the sub display driver 7 are connected through a low-speed serial bus of which the transfer rate is lower than that of the high-speed serial bus. The low-speed serial bus is a serial bus using a signal at a CMOS voltage level (e.g. 0 to 3 V or 0 to 5 V). The display driver 10 outputs serial data (data signal at the CMOS voltage level) to the sub display driver 7 using the low-speed serial bus.

In FIG. 1, the host device 5 is mounted in a first instrument section (first circuit board) in which telephone number buttons of the portable telephone are provided. The main display driver 10, the display panel 6, the sub display driver 7, and the sub display panel 8 are mounted in a second instrument section (second circuit board) of the portable telephone. Therefore, EMI noise can be reduced in comparison with a known electronic instrument by transferring packets between the host device 5 and the display driver 10 through the high-speed serial bus. Moreover, a serial signal line can be used as a signal line passing through a connection section (e.g. hinge) which connects the first and second instrument sections, so that mounting of the instrument can be facilitated.

2. Configuration of Display Driver

Figure 2:
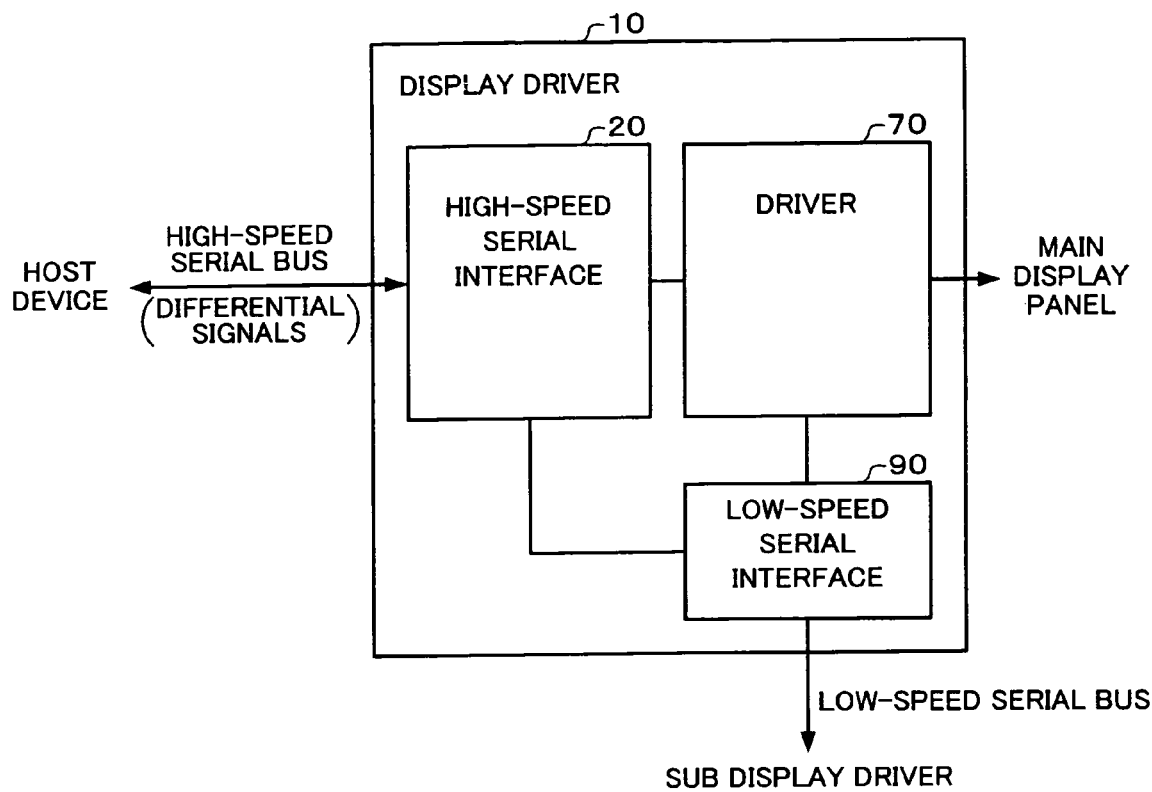
FIG. 2 is a configuration example of the display driver according to one embodiment of the invention.

FIG. 2 shows a configuration example of the display driver 10 according to one embodiment of the invention. The display driver 10 (main display driver) includes a high-speed serial interface circuit 20, a driver circuit 70, and a low-speed serial interface circuit 90.

The high-speed serial interface circuit 20 receives a packet (data) from the host device 5 through the high-speed serial bus. The high-speed serial interface circuit 20 outputs a command or data included in the received packet. Note that "data" used herein includes a "parameter".

In more detail, the host device 5 transmits a packet (packet stream) by current-driving or voltage-driving the differential signal lines. The high-speed serial interface circuit 20 which has received the packet from the host device 5 extracts a command from a header field of the received packet, and outputs the extracted command to the driver circuit 70 or the like. The high-speed serial interface circuit 20 extracts data (parameter) from a data field of the received packet, and outputs the extracted data (parameter) to the driver circuit 70 or the like.

The driver circuit 70 drives the main display panel 6 based on the command or data output from the high-speed serial interface circuit 20. In more detail, the driver circuit 70 sets the drive conditions (display characteristic control parameter) or the like of the main display panel 6 based on the command or the parameter (data in a broad sense) received from the host device 5 through the high-speed serial interface circuit 20. For example, the driver circuit 70 sets the format type (RGB888, RGB666, RGB565, or RGB444) of display data, the number of display lines, the display range, the write start position of the display data, the drive method, or the like. The driver circuit 70 drives the data lines of the main display panel 6 or the like according to the set drive conditions based on display data (data in a broad sense) received from the host device 5 through the high-speed serial interface circuit 20.

When the packet received from the host device 5 includes a sub display driver command or data, the low-speed serial interface circuit 90 serially outputs the sub display driver command or data to the sub display driver 7 through the low-speed serial bus. A modification is also possible in which a low-speed parallel interface circuit is used instead of the low-speed serial interface circuit.

The transfer rate of the low-speed serial bus is lower than that of the high-speed serial bus. Therefore, the low-speed serial interface circuit 90 outputs the sub display driver command or data to the sub display driver 7 through the low-speed serial bus at a transfer rate lower than that of the high-speed serial bus.

In more detail, when the packet received from the host device 5 includes a main display driver command or data, the command or the data is output to the driver circuit 70. On the other hand, when the packet includes a sub display driver command or data, the command or the data is input to the low-speed serial interface circuit 90 from the high-speed serial interface circuit 20 through the driver circuit 70 (or, directly from the high-speed serial interface circuit 20). The low-speed serial interface circuit 90 outputs the input command or data to the sub display driver 7 as a serial data signal.

In this case, the serial data signal output to the low-speed serial bus may be a signal at the CMOS voltage level, for example.

As described above, in one embodiment of the invention, the low-speed serial interface circuit 90 for the sub display driver is provided in addition to the high-speed serial interface circuit 20. This allows the sub display driver 7 to be controlled without providing a high-speed serial interface circuit in the sub display driver 7. Therefore, since a generally used product can be used as the sub display driver 7, the cost of the instrument can be reduced.

In one embodiment of the invention, the number of signal lines provided between the host device 5 and the display driver 10 is reduced by connecting the host device 5 and the display driver 10 through the high-speed serial bus. Taking a portable telephone as an example, mounting is facilitated by reducing the number of signal lines provided in the connection section (hinge section) which connects the first and second instrument sections.

However, when performing a high-speed serial transfer between the host device 5 and the sub display driver 7, since it is necessary to additionally provide differential signal lines connecting the host device 5 and the sub display driver 7, the advantage obtained by reducing the number of signal lines is impaired.

According to one embodiment of the invention, a command or data is output to the sub display driver 7 through the display driver 10. Therefore, since it is unnecessary to connect the host device 5 and the sub display driver 7 through the high-speed serial bus, differential signal lines need not be additionally provided. Therefore, the advantage of the high-speed serial bus can be utilized.

As a method of a comparative example, a command or data from the host device may be transferred to the sub display driver merely through the main display driver. According to the method of the comparative example, even if the host device can output only one chip select signal, a command or data can be transmitted to the sub display driver.

However, since the method of the comparative example transfers a command or data merely through the main display driver, the rate of serial transfer between the host device and the main display driver is equal to the rate of serial transfer between the main display driver and the sub display driver. Therefore, when connecting the host device and the main display driver through the high-speed serial bus, the main display driver and the sub display driver must be connected through the high-speed serial bus. As a result, it is necessary to also provide a high-speed serial interface circuit in the sub display driver. Therefore, since a generally used sub display driver cannot be used, the cost of the instrument is increased.

According to one embodiment of the invention, while the host device 5 and the main display driver 10 are connected through the high-speed serial bus, and the display driver 10 and the sub display driver 7 are connected through the low-speed serial bus. Therefore, since it is unnecessary to provide a high-speed serial interface circuit in the sub display driver, a generally used sub display driver can be used. Therefore, the cost of the instrument can be reduced in comparison with the method of the comparative example.

3. Dummy Data

Since the sub display driver 7 drives the sub display panel 8 having a small panel size, the operation speed of the sub display driver 7 is generally lower than that of the main display driver 10. Therefore, if data (display data) transferred from the host device 5 through the high-speed serial bus is directly transferred to the sub display driver 7, there may be a case where the sub display driver 7 cannot receive the data.

In this case, the transfer rate of the high-speed serial bus may be reduced when transferring the sub display driver data. However, if the transfer rate of the high-speed serial bus is rapidly reduced, a long time is required until the clock frequency of a PLL circuit provided in the host device 5 becomes stable. A long time is also required to recover the clock frequency. This makes it necessary to suspend data transfer through the high-speed serial bus until the PLL circuit becomes stable, so that the data transfer efficiency is decreased.

Figure 3:
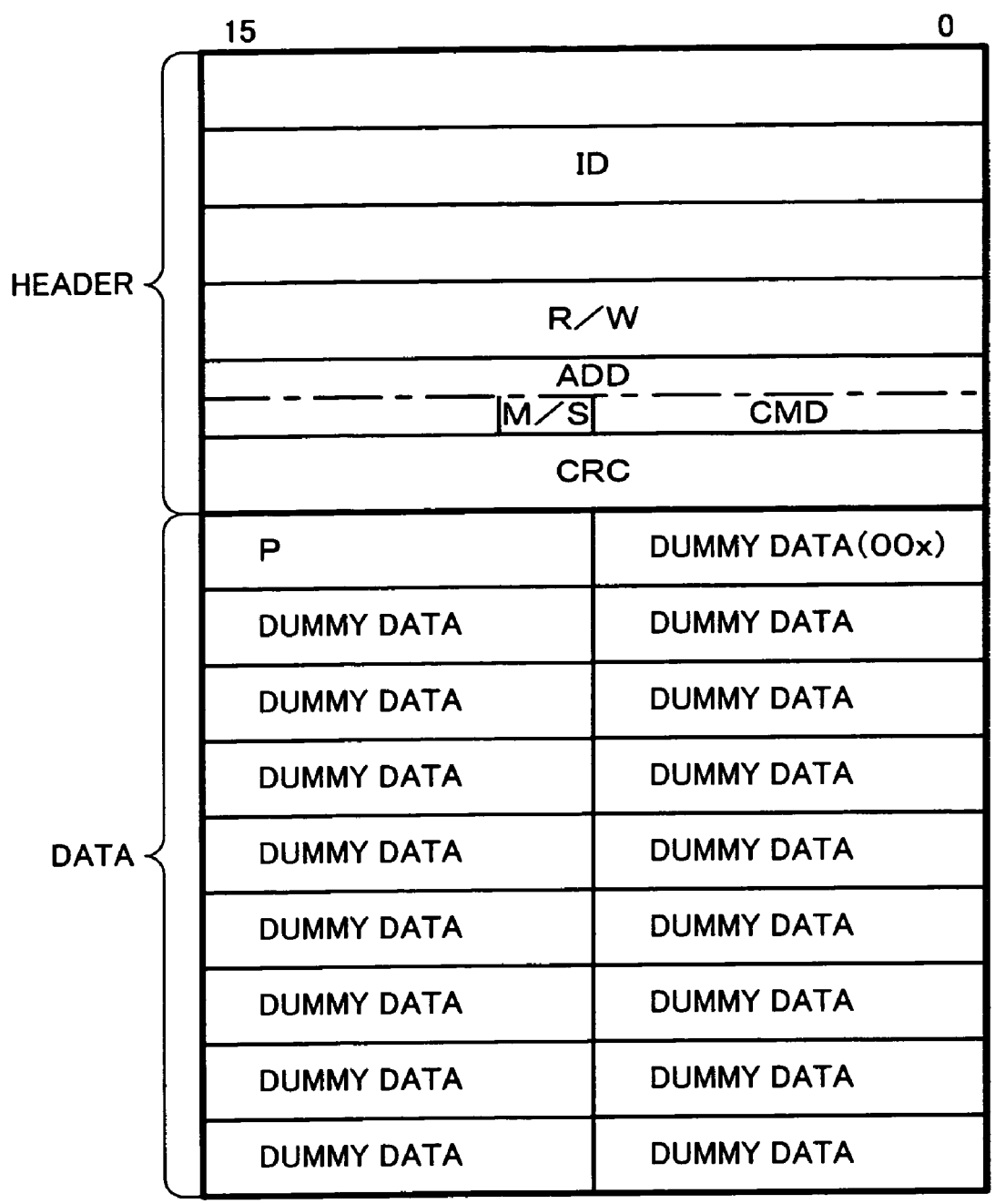
FIG. 3 is a format example of a packet.

In one embodiment of the invention, transfer rate adjustment dummy data is inserted in a packet transferred through the high-speed serial bus. FIG. 3 shows a format example of a packet transferred through the high-speed serial bus. For example, an ID (identification information) field, an FM (read/write) field, an ADD (address) field, a CRC field, and the like are provided in the header field of the packet. Dummy data (00x) is set in the data field of the packet in addition to a parameter P (data).

Specifically, the high-speed serial interface circuit 20 shown in FIG. 2 receives the packet shown in FIG. 3 in which the sub display driver data (P) and the transfer rate adjustment dummy data are set in the data field. The low-speed serial interface circuit 90 outputs the sub display driver data (P) to the sub display driver 7 from the sub display driver data (P) and the dummy data (00x) set in the data field. In more detail, the display driver 10 includes an extraction circuit which extracts the sub display driver data from the data field of the received packet. The sub display driver data extracted by the extraction circuit is output to the sub display driver 7 through the low-speed serial bus.

The difference in transfer rate between the high-speed serial bus and the low-speed serial bus can be automatically adjusted by setting such dummy data, so that the sub display driver data can be output to the low-speed serial bus at low speed. This allows the sub display driver 7 to appropriately receive the sub display driver data transferred from the display driver 10 even if the operation speed of the sub display driver 7 is low. This makes it possible to utilize a generally used low-speed sub display driver, whereby the cost of the instrument can be reduced. Moreover, it becomes unnecessary to adjust the transfer rate of the high-speed serial bus by changing the clock frequency of the PLL circuit of the host device 5. This makes it unnecessary to wait for the PLL circuit to become stable, whereby the data transfer efficiency can be increased. A modification is also possible in which the transfer rate of the high-speed serial bus is adjusted without setting the dummy data in the packet.

The transfer rate of the high-speed serial bus is indicated by VH, and the transfer rate of the low-speed serial bus is indicated by VL. It is preferable to set the dummy data so that the number of bytes (amount of data) of dummy data set in the data field of the packet is increased as the ratio "VL/VH" becomes smaller.

Suppose that the transfer rate VH of the high-speed serial bus is 200 Mbps, and the transfer rate VL of the low-speed serial bus is 25 Mbps or 12.5 Mbps, for example. The ratio "VL/VH" is smaller when "VL=12.5 Mbps" than when "VL=25 Mbps". Therefore, the number of bytes of dummy data when "VL=12.5 Mbps" is increased in comparison with the number of bytes of dummy data when "VL=25 Mbps". This makes it possible to set an optimum number of bytes of dummy data corresponding to the ratio of the transfer rate VH of the high-speed serial bus and the transfer rate VL of the low-speed serial bus, so that the adjustment of the transfer rate using the dummy data can be optimized. As a result, the size of a data buffer (e.g. FIFO buffer) provided in the display driver can be reduced, whereby the circuit scale can be reduced.

In one embodiment of the invention, the high-speed serial interface circuit 20 receives a packet in which a sub display driver command CMD is set in the header field as shown in FIG. 3. The low-speed serial interface circuit 90 outputs the command CMD set in the header field of the packet to the sub display driver 7 as the sub display driver command.

For example, the MDDI standard specifies that a two-byte ADD (address) field be provided in the header field of a packet. In one embodiment of the invention, the sub display driver command CMD is set in the lower-order byte of the ADD field, as shown in FIG. 3. Specifically, the host device 5 inserts the command CMD in the lower-order byte of the ADD field and transmits the resulting packet. The high-speed serial interface circuit 20 extracts the command CMD from the ADD field, for example. In more detail, the extraction circuit, which extracts the sub display driver data from the data field of the packet, extracts the command CMD from the header field of the packet. The extracted command CMD is then transferred to the low-speed serial interface circuit 90. The low-speed serial interface circuit 90 outputs the command CMD to the sub display driver 7 as the sub display driver command.

This enables not only the sub display driver data (parameter), but also the sub display driver command to be extracted from the packet and output to the sub display driver 7. Therefore, the main display driver 10 need not interpret the command and transfer the command to the sub display driver 7, so that the circuit can be simplified. Moreover, the format of the packet specified in the MDDI standard can be maintained by transferring the command CMD by effectively utilizing the ADD field specified in the MDDI standard.

4. Destination Information

In one embodiment of the invention, the host device 5 transmits not only the main display driver command or data, but also the sub display driver command or data to the display driver 10. For example, when displaying an image for a portable telephone on the main display panel 6, the host device 5 transmits the main display driver command or data to the display driver 10. On the other hand, when the first and second instrument sections of the portable telephone are closed and a clock display or the like is displayed on the sub display panel 8, the host device 5 transmits the sub display driver command or data to the display driver 10. Therefore, it is necessary to identify (distinguish) the main display driver command or data and the sub display driver command or data.

In one embodiment of the invention, destination information for designating the destination of the command or data is included in the packet transferred through the high-speed serial bus. In more detail, since the higher-order byte of the ADD field is a space area, a one-bit M/S field for identifying the main and the sub is provided in the least significant bit (LSB) of the space area, as shown in FIG. 3. The host device 5 sets the destination information in the M/S field.

The high-speed serial interface circuit 20 receives the packet including the destination information from the host device 5. When the sub display driver 7 is designated as the destination by the destination information, the low-speed serial interface circuit 90 outputs the command or data from the high-speed serial interface circuit 20 to the sub display driver 7.

In more detail, when "1" is set in the M/S field of the packet shown in FIG. 3, the high-speed serial interface circuit 20 determines that the command (CMD) or data (P) included in the packet is the main display driver command or data. Therefore, the high-speed serial interface circuit 20 outputs the command or data included in the received packet to the driver circuit 70. On the other hand, when "0" is set in the M/S field, the high-speed serial interface circuit 20 determines that the command or data included in the packet is the sub display driver command or data. Therefore, the high-speed serial interface circuit 20 outputs the command or data included in the received packet to the low-speed serial interface circuit 90. The low-speed serial interface circuit 90 serially outputs the command or data to the sub display driver 7.

The data or command included in the packet can be automatically classified and output to the driver circuit 70 (main) or the low-speed serial interface circuit 90 (sub) by setting the destination information (designation information) in the packet transferred through the high-speed serial bus. As a result, the command or data included in the packet can be output to the sub display driver 7 without increasing the processing load to a large extent.

The destination information included in the packet is not limited to the information set in the M/S field as shown in FIG. 3, and may be set in another field. Or, the command or data may be classified without using the destination information.

For example, a command register into which the command included in the received packet is written is provided in the display driver 10. The command register may be provided in the driver circuit 70, for example. When a command which enables output of a command or data to the sub display driver has been written into the command register, the low-speed serial interface circuit 90 outputs the command or data from the high-speed serial interface circuit 20 to the sub display driver 7. This enables the command or data included in the packet to be classified and transferred to the sub display driver 7 without setting the destination information in the packet.

5. Detailed Configuration Example

Figure 4:
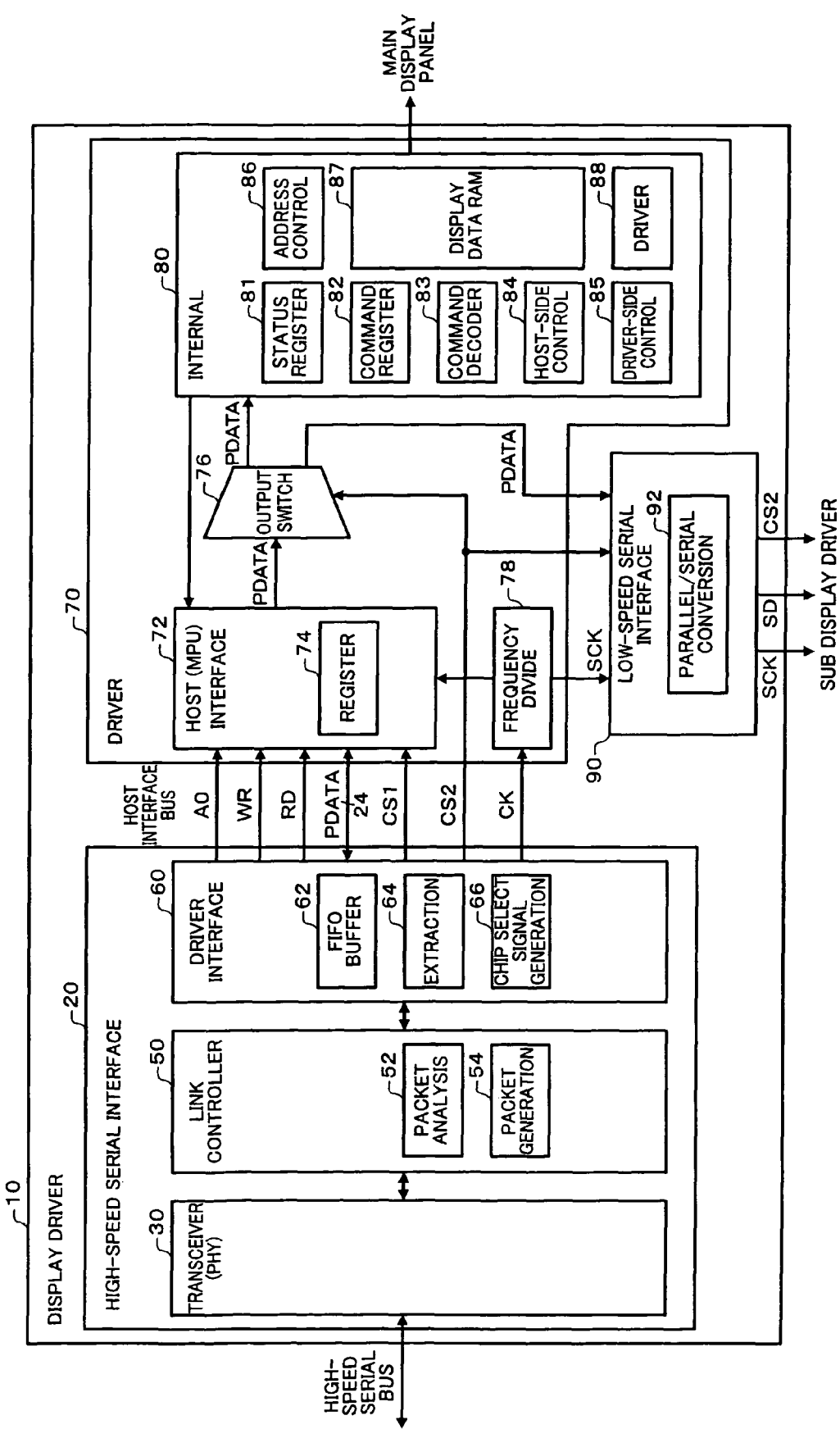
FIG. 4 is a detailed configuration example of the display driver according to one embodiment of the invention.

FIG. 4 shows a detailed configuration example of the display driver according to one embodiment of the invention. Note that some of the circuit blocks shown in FIG. 4 may be omitted, or the configuration of the connection between the circuit blocks may be changed, or a circuit block differing from the circuit blocks shown in FIG. 4 may be additionally provided.

As shown in FIG. 4, the high-speed serial interface circuit 20 includes a transceiver 30, a link controller 50, and a driver interface circuit 60.

The transceiver 30 is a circuit for receiving or transmitting a packet (command or data) through the high-speed serial bus using differential signals (differential data signals, differential strobe signals, and differential clock signals). In more detail, a packet is transmitted or received by current-driving or voltage-driving the differential signal lines of the high-speed serial bus. The transceiver 30 may include a physical layer circuit (analog front-end circuit) which drives the differential signal lines, a high-speed logic circuit, and the like.

The link controller 50 performs link layer (transaction layer) processing of high-speed serial transfer. In more detail, when the transceiver 30 has received a packet from the host device 5 through the high-speed serial bus, the link controller 50 analyzes the received packet. Specifically, the link controller 50 separates the received packet into the header and the data and extracts the header. When transmitting a packet to the host device 5 through the high-speed serial bus, the link controller 50 generates the packet transmitted to the host device 5. In more detail, the link controller 50 generates the header of the packet transmitted to the host device 5, and assembles the packet by combining the header and data. The link controller 50 directs the transceiver 30 to transmit the generated packet. The packet is analyzed by a packet analysis circuit 52 included in the link controller 50, and the packet is generated by a packet generation circuit 54.

The driver interface circuit 60 performs host interface processing between the high-speed serial interface circuit 20 (link controller 50) and the driver circuit 70. In FIG. 4, the high-speed serial interface circuit 20 and the driver circuit 70 are connected through a host interface bus. The driver interface circuit 60 generates host interface signals and outputs the generated host interface signals to the driver circuit 70. The host interface signals include an address 0 signal A0 which is a command/data identification signal, write and read signals WR and RD respectively directing writing and reading, a parallel data signal PDATA which is a command or data signal, and a chip select signal CS1 directing chip select of the driver circuit 70.

The driver interface circuit 60 includes a first-in first-out (FIFO) buffer 62, an extraction circuit 64, and a chip select signal generation circuit 66. The driver interface circuit 60 may have a configuration in which some of these blocks are omitted.

The FIFO buffer 62 functions as an elastic buffer for adjusting the difference in data transfer rate between the high-speed serial interface circuit and the driver circuit. For example, a command or data from the link controller 50 is written into the FIFO buffer 62. The written command or data is read from the FIFO buffer 62 at a timing depending on the operation speed of the driver circuit 70, and output to the driver circuit 70 as the parallel data signal PDATA.

The extraction circuit 64 extracts the sub display driver data (P) from the sub display driver data and the dummy data set in the data field of the received packet. The extraction circuit 64 also extracts the command (CMD) set in the header field of the received packet. The extracted sub display driver data or command is output to the driver circuit 70 as the parallel data signal PDATA. The command is output using an eight-bit signal line of a 24-bit PDATA bus. RGB888 display data, RGB666 display data, RGB565 display data, and RGB444 display data are respectively output using the 24-bit bus, 18-bit bus, 16-bit bus, and 12-bit bus of the PDATA bus.

The chip select signal generation circuit 66 generates and outputs the chip select signals CS1 and CS2. In more detail, the chip select signal generation circuit 66 generates and outputs the chip select signal CS2 separately from the chip select signal CS1 included in the host interface signals. The command or data can be selectively transferred to either an internal circuit 80 of the driver circuit 70 or the low-speed serial interface circuit 90 by using the chip select signal CS2.

The driver circuit 70 includes a host interface circuit 72, an output switch circuit 76, a frequency divider circuit 78, and the internal circuit 80. The driver circuit 70 may have a configuration in which some of these blocks are omitted.

The host (MPU) interface circuit 72 performs host interface processing between the high-speed serial interface circuit 20 and the driver circuit 70. In more detail, the high-speed serial interface circuit 20 (driver interface circuit 60) outputs the host interface signals including the parallel data signal PDATA. The host interface circuit 72 receives the host interface signals and outputs the parallel data signal PDATA included in the host interface signals to the subsequent stage. For example, when the write signal WR has been set to active, the host interface circuit 72 latches the parallel data signal PDATA received from the high-speed serial interface circuit 20 in a register 74 included in the host interface circuit 72. The host interface circuit 72 outputs the latched parallel data signal PDATA to the output switch circuit 76. In this case, the parallel data signal PDATA is processed as a command when the address 0 signal A0 is set at the low level (first level), and processed as data (parameter or display data) when the address 0 signal A0 is set at the high level (second level).

The output switch circuit 76 receives the parallel data signal PDATA from the host interface circuit 72, and outputs the parallel data signal PDATA to either the internal circuit 80 of the driver circuit 70 or the low-speed serial interface circuit 90. In this case, the parallel data signal PDATA is selectively output to either the internal circuit 80 or the low-speed serial interface circuit 90 based on the chip select signal CS2. For example, the parallel data signal PDATA is output to the low-speed serial interface circuit 90 when the chip select signal CS2 is set at the low level (first level), and output to the internal circuit 80 when the chip select signal CS2 is set at the high level (second level).

The frequency divider circuit 78 divides the frequency of a clock signal CK received from the high-speed serial interface circuit 20, and outputs the divided clock signal to the host interface circuit 72 and the low-speed serial interface circuit 90. In more detail, the high-speed serial interface circuit 20 receives the differential strobe signals (or differential clock signals) from the host device 5 as the differential signals of the high-speed serial bus. The high-speed serial interface circuit 20 outputs the clock signal CK (e.g. 50 MHz) obtained by the differential strobe signals (or differential clock signals) to the driver circuit 70. The frequency divider circuit 78 divides the frequency of the clock signal CK. The low-speed serial interface circuit 90 outputs the sub display driver command or data to the sub display driver 7 as a serial data signal SD based on a clock signal SCK obtained by dividing the frequency of the clock signal CK. The frequency divider circuit 78 may be provided in the high-speed serial interface circuit 20.

The internal circuit 80 is a circuit for driving the main display panel 6. The internal circuit 80 includes a status register 81, a command register 82, a command decoder 83, a host-side control circuit 84, a driver-side control circuit 85, an address control circuit 86, a display data RAM 87, and a driver section 88. The internal circuit 80 may have a configuration in which some of these blocks are omitted.

The status register 81 stores status information of the display driver 10 (whether or not the display is ON, or whether the mode is a partial display mode or a sleep mode). The command register 82 stores the command input through the host interface circuit 72. The command decoder 83 decodes (interprets) the command (parameter), and notifies the host-side control circuit 84 or the like of the decode result. The host-side control circuit 84 controls a read/write operation for the display data RAM 87 based on the command decode result. The read/write operation is realized by the address control circuit 86.

The driver-side (panel-side) control circuit 85 generates a grayscale control pulse, a polarity reversal signal, a latch pulse, and the like based on a reference clock signal, and performs control necessary for the display operation of the main display panel 6.

The address control circuit 86 designates a write column address, a read column address, a write page address, and a read page address of the display data under control of the host-side control circuit 84. The address control circuit 86 is controlled by the driver-side control circuit 85, and designates a display address in line units, for example.

The display data RAM 87 is a memory which stores the display data. The display data input through the host interface circuit 72 is written into the display data RAM 87. The driver section 88 generates a data line voltage based on the display data read from the display data RAM 87, and outputs the data line voltage to the data lines of the main display panel 6 to drive the data lines. The driver section 88 may also drive the scan lines.

The low-speed serial interface circuit 90 receives the parallel data signal PDATA input from the host interface circuit 72 through the output switch circuit 76. The parallel data signal PDATA includes the sub display driver command or data. The low-speed serial interface circuit 90 converts the parallel data signal PDATA to the serial data signal SD, and outputs the serial data signal SD to the sub display driver 7. The parallel data signal PDATA is converted by a parallel/serial conversion circuit 92.

The low-speed serial interface circuit 90 outputs the serial transfer clock signal SCK and the chip select signal CS2 for chip-selecting the sub display driver 7 to the sub display driver 7 in addition to the serial data signal SD. The clock signal SCK is a clock signal obtained by dividing the frequency of the clock signal CK obtained by the differential strobe signals (or differential clock signals) of the high-speed serial bus. When the transfer rate of the high-speed serial bus is 200 Mbps and the frequency of the clock signal CK is 50 MHz, a signal having a frequency of 25 MHz or 12.5 MHz may be used as the clock signal SCK, for example. The sub display driver 7 receives the serial data signal SD based on the clock signal SCK.

The low-speed serial interface circuit 90 outputs command/data identification information (D/C) for identifying (distinguishing) a command or data to the sub display driver 7 while associating the command/data identification information with the serial data signal (sub display driver command or data). The sub display driver 7 can determine whether a command or data (parameter) has been output by the serial data signal based on the command/data identification information (D/C).

6. Operation

Figure 5:
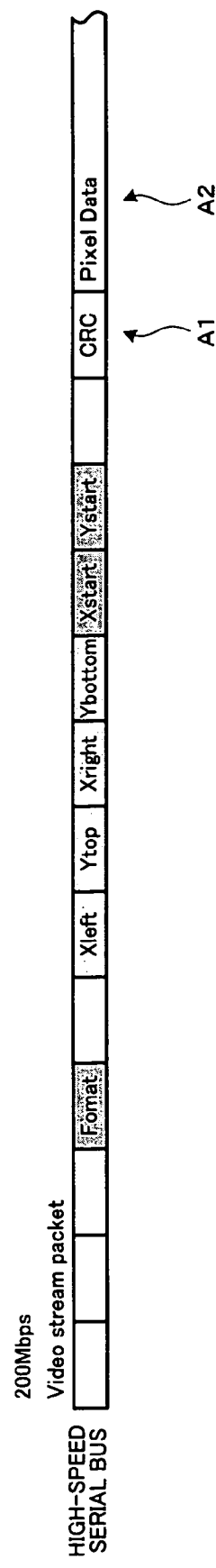
FIG. 5 is a signal waveform diagram illustrative of the operation according to one embodiment of the invention.
Figure 6A:
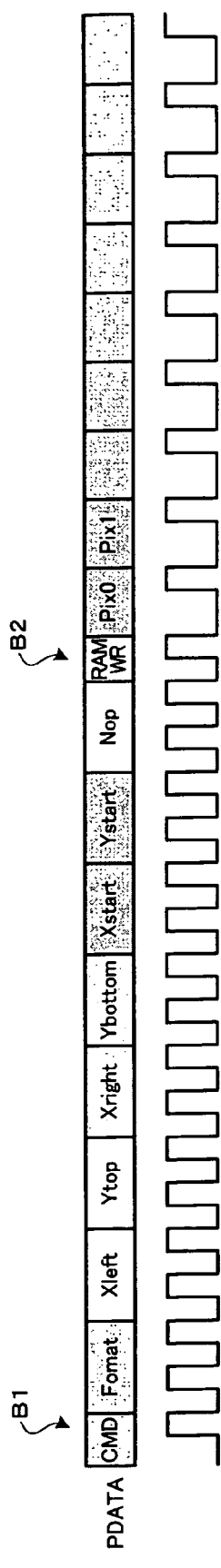
FIGS. 6A and 6B are signal waveform diagram illustrative of the operation according to one embodiment of the invention.
Figure 6B:
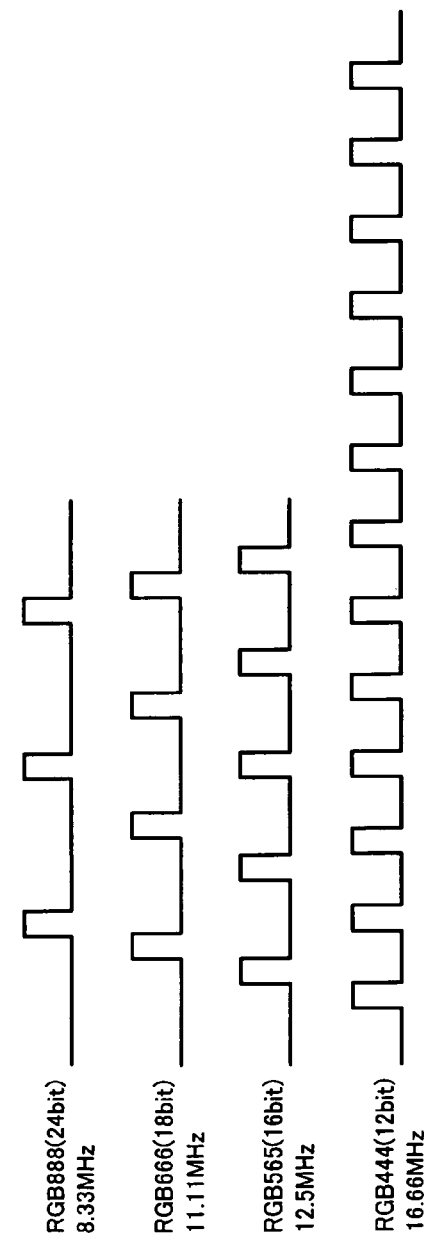
Figure 7:
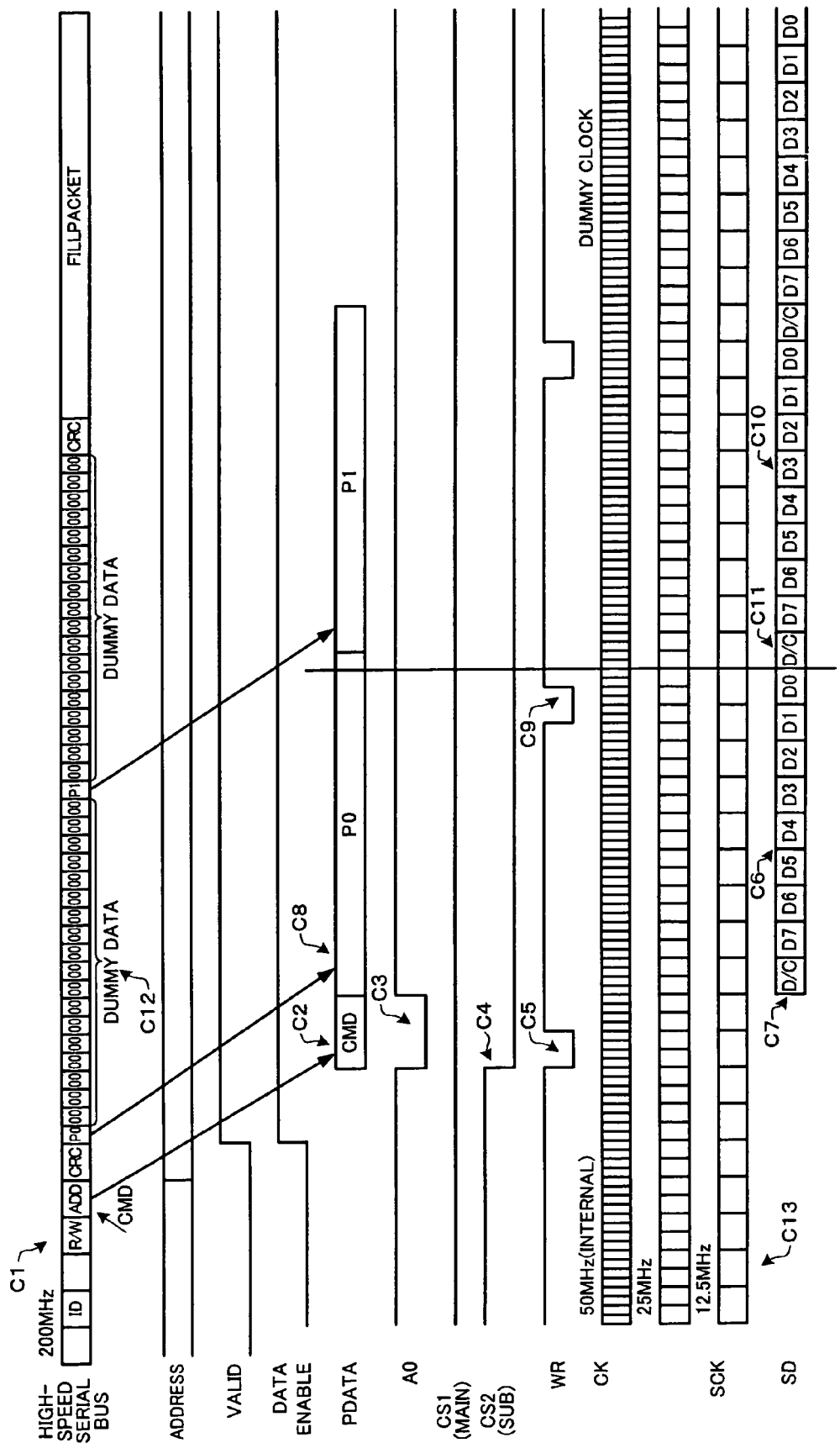
FIG. 7 is a signal waveform diagram illustrative of the operation according to one embodiment of the invention.

The details of the operation according to one embodiment of the invention are described below using timing waveform diagrams of FIGS. 5 to 9. FIGS. 5, 6A, and 6B are waveform diagrams when transferring the main display driver command or data, and FIG. 7 is a waveform diagram when transferring the sub display driver command or data.

FIG. 5 shows the state of a packet transferred through the high-speed serial bus. For example, a video stream packet is transferred through the high-speed serial bus at 200 Mbps. In FIG. 5, a parameter Format designates the format type of display (pixel) data. Whether the display data is in the RGB888, RGB666, RGB565, or RGB444 format is designated by the parameter Format. Parameters Xleft to Ybottom designate the write range (display range) of the display data. Parameters Xstart and Ystart designate the write position of the display data. A parameter CRC (cyclic redundancy check) is used to detect occurrence of a transfer error. The parameters Format to CRC are set in the header field of the packet. Display data PixelData is set in the data field of the packet. The link controller 50 outputs the display data indicated by A2 to the driver interface circuit 60 on condition that a CRC error has not been detected at A1 in FIG. 5.

The driver interface circuit 60 outputs a command CMD for setting the drive conditions as indicated by B1 in FIG. 6A, and outputs the parameters Format, Xleft to Ybottom, Xstart, and Ystart as the parameters of the command. The driver interface circuit 60 then outputs a write command RAMWR for the display data RAM 87 as indicated by B2, and outputs display data "Pix0", "Pix1", . . . .

As shown in FIG. 6B, when outputting the display data, it is preferable to variably control the frequency of the clock signal corresponding to the format of the display data. For example, the clock frequency is decreased when the display data is in the 24-bit RGB888 format, and is increased when the display data is in the 12-bit RGB444 format. The frequency may be adjusted by the frequency divider circuit or the like.

RGB data is continuously transferred through the high-speed serial bus at a constant transfer rate of 200 Mbps, for example. The RGB data transferred at a constant transfer rate is continuously input to the high-speed serial interface circuit 20, and the input RGB data is stored in the FIFO buffer 62. On the other hand, the high-speed serial interface circuit 20 outputs the RGB data to the driver circuit 70 in pixel units. The number of bits of data of each pixel is smaller in the RGB444 format than in the RGB888 format. Therefore, the high-speed serial interface circuit 20 outputs the RGB data to the driver circuit 70 at a high clock frequency when the RGB data is in the RGB444 format. Therefore, the driver circuit 70 receives the RGB data from the high-speed serial interface circuit 20 at a high clock frequency when the RGB data is in the RGB444 format, as shown in FIG. 6B.

When transferring the sub display driver command or data, the packet is transferred through the high-speed serial bus as indicated by C1 in FIG. 7. The sub display driver command CMD is set in the address ADD field of the header of the packet as described with reference to FIG. 3. As indicated by C2 in FIG. 7, the high-speed serial interface circuit 20 outputs the command CMD to the driver circuit 70 as the parallel data signal PDATA. The high-speed serial interface circuit 20 sets the address 0 signal A0 at the low level as indicated by C3 to indicate that the command CMD is a command. The high-speed serial interface circuit 20 sets the chip select signal CS2 at the low level (active) as indicated by C4 to switch the output from the output switch circuit 76 to the low-speed serial interface circuit 90. The high-speed serial interface circuit 20 sets the write signal WR at the low level (active) at a timing indicated by C5. This causes the parallel data signal PDATA (CMD) to be latched by the register 74 and output to the low-speed serial interface circuit 90 through the output switch circuit 76. The low-speed serial interface circuit 90 converts the parallel data signal PDATA (CMD) to the serial data signal SD (D7 to D0), and outputs the serial data signal SD to the sub display driver 7 as indicated by C6 in FIG. 7.

D/C indicated by C7 in FIG. 7 is the command/data identification information. The low-speed serial interface circuit 90 outputs the command/data identification information D/C to the sub display driver 7 while associating the command/data identification information D/C with the serial data signal SD (command or data). For example, the command/data identification information D/C is set at zero ("D/C=0") at C7 so that the sub display driver 7 is notified that a command is transferred by the serial data signal SD indicated by C6.

The high-speed serial interface circuit 20 then extracts the parameter P0 set in the data field of the packet, and outputs the parameter P0 to the driver circuit 70 as the parallel data signal PDATA, as indicated by C8. The high-speed serial interface circuit 20 sets the write signal WR at the low level at a timing indicated by C9. This causes the parallel data signal PDATA (P0) to be latched in the register 74 and output to the low-speed serial interface circuit 90 through the output switch circuit 76. The low-speed serial interface circuit 90 converts the parallel data signal PDATA (P0) to the serial data signal SD, and outputs the serial data signal SD to the sub display driver 7 as indicated by C10 in FIG. 7. In this case, the command/data identification information D/C is set at one ("D/C=1") at C11 so that the sub display driver 7 is notified that a parameter is transferred by the serial data signal SD indicated by C10. The parameter P1 and the display data are transferred to the low-speed serial interface circuit 90 and output to the sub display driver 7 in the same manner as described above.

In one embodiment of the invention, the transfer rate adjustment dummy data is inserted in the data field of the packet, as indicated by C12 in FIG. 7. The write signal WR can be activated at an increased time interval as indicated by C5 and C9 by inserting the dummy data. This allows the command or data to be transferred to the low-speed serial interface circuit 90 at an increased time interval. Therefore, the frequency of the serial transfer clock signal SCK can be reduced as indicated by C13, so that the transfer rate of the serial data signal SD can be decreased as indicated by C6 and C10. This makes it possible to utilize a generally used low-speed sub display driver, whereby the cost of the instrument can be reduced.

In one embodiment of the invention, the output destination of the parallel data signal PDATA from the host interface circuit 72 is switched by the output switch circuit 76 to output the parallel data signal PDATA to the low-speed serial interface circuit 90. The low-speed serial interface circuit 90 then converts the parallel data signal PDATA to the serial data signal SD. This enables the sub display driver command or data to be transferred to the low-speed serial interface circuit 90 by effectively utilizing the host interface circuit 72 generally included in the driver circuit 70. Therefore, the circuit scale and the design period can be reduced, for example.

In one embodiment of the invention, the chip select signal CS2 is generated separately from the host interface chip select signal CS1, and the output destination of the output switch circuit 76 is switched based on the chip select signal CS2. This enables the sub display driver command or data to be transferred to the low-speed serial interface circuit 90 by merely generating the chip select signal CS2. Therefore, the circuit scale can be reduced, for example.

In one embodiment of the invention, the clock signal SCK indicated by C13 is generated based on the clock signal CK obtained by dividing the frequency of the clock signal obtained by the differential strobe signals or the differential clock signals of the high-speed serial bus. The sub display driver command (CMD) or data (P0, P1) is output to the sub display driver 7 as the serial data signal SD based on the clock signal SCK, as indicated by C6 and C10.

As a method of a comparative example, a PLL circuit may be provided in the display driver 10, and the serial data signal SD may be output to the sub display driver 7 based on a clock signal generated by the PLL circuit. However, this method cannot ensure that the clock signal SCK and the serial data signal SD have a synchronization relationship. Therefore, the serial data signal output to the sub display driver 7 may be shifted so that a change in the display position or the like may occur in the sub display panel 8.

In one embodiment of the invention, since the clock signal SCK is generated based on the clock signal obtained by dividing the frequency of the clock signal obtained by the differential strobe signals or the differential clock signals, the clock signal SCK and the serial data signal SD reliably have a synchronization relationship. Therefore, occurrence of a change in the display position or the like in the sub display panel 8 can be prevented.

7. Modification

Figure 8:
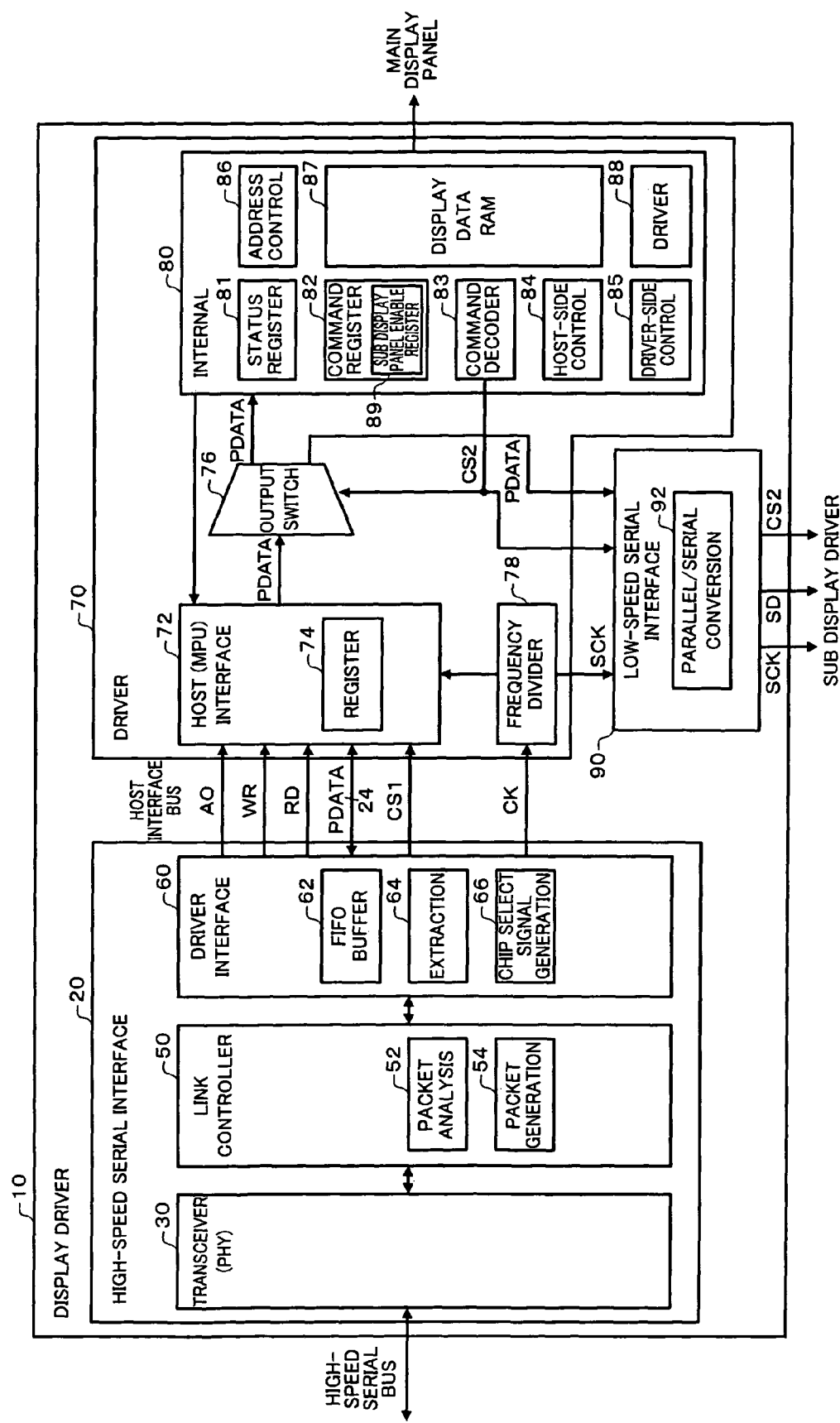
FIG. 8 is a modification according to one embodiment of the invention.

FIG. 8 shows a modification according to one embodiment of the invention. FIG. 8 differs from FIG. 4 in that the chip select signal CS2 is generated by the command decoder 83 which decodes the command set in the command register 82. In FIG. 8, the output destination of the output switch circuit 76 is switched based on the chip select signal CS2 thus generated.

In FIG. 8, the command register 82 of the internal circuit 80 (main) includes a sub display panel enable register 89 (enable bit). Suppose that a command which enables output of a command or data to the sub display driver has been written into the sub display panel enable register 89. Then, the low-speed serial interface circuit 90 outputs the command or data (PDATA) from the high-speed serial interface circuit 20 to the sub display driver 7. For example, when "1" has been written into the sub display panel enable register 89, the command decoder 83 decodes the data written into the sub display panel enable register 89 and sets the chip select signal CS2 at the low level (active). This causes the output destination of the output switch circuit 76 to be switched to the low-speed serial interface circuit 90, so that the parallel data signal PDATA is input to the low-speed serial interface circuit 90. The low-speed serial interface circuit 90 converts the parallel data signal PDATA to the serial data signal SD, and outputs the serial data signal SD to the sub display driver 7.

This enables the sub display driver command or data to be transferred to the low-speed serial interface circuit 90 by switching the output destination of the output switch circuit 76 without providing the destination information M/S field as shown in FIG. 3 in the header of the packet.

8. Transceiver

Figure 9:
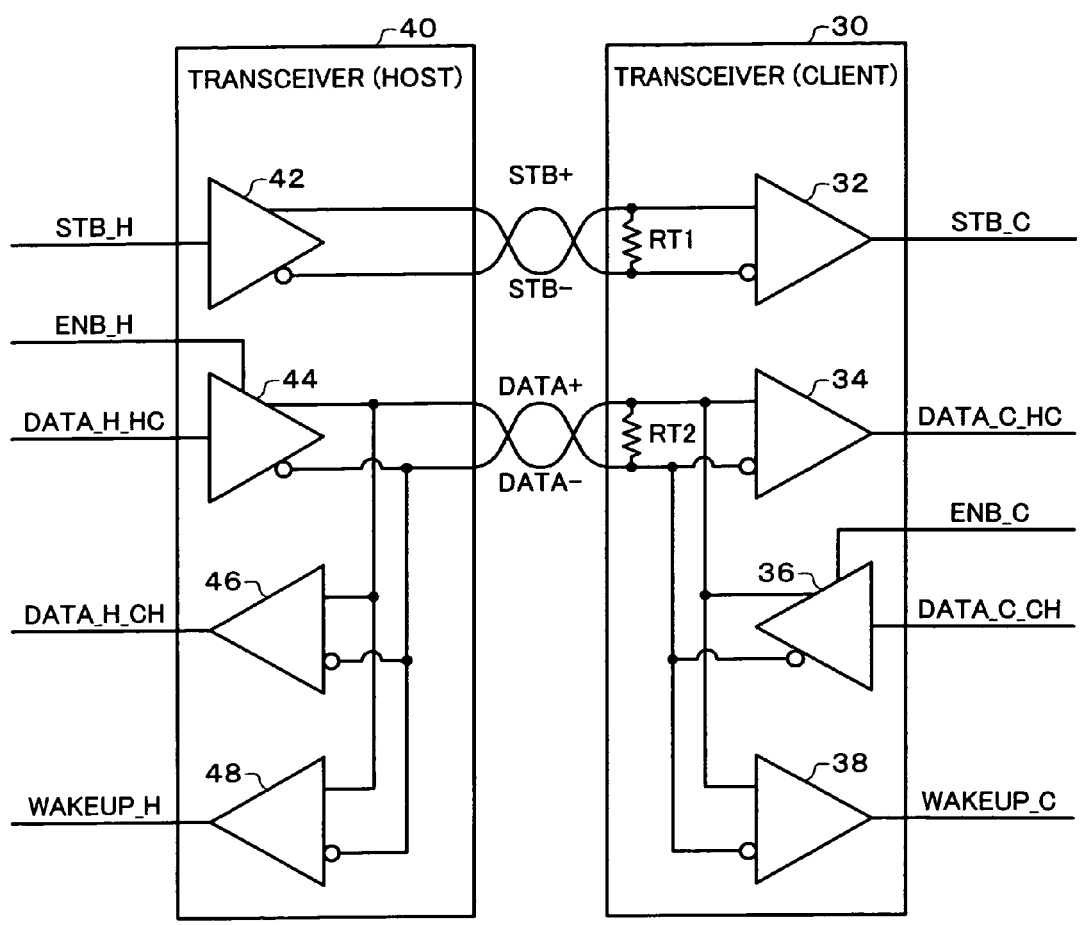
FIG. 9 is a configuration example of a transceiver.

FIG. 9 shows a configuration example of the transceiver which performs high-speed serial transfer. FIG. 9 is an example of the transceiver conforming to the MDDI standard. In FIG. 9, a transceiver 40 is provided in the host device 5, and the transceiver 30 is provided in the display driver 10. Reference numerals 36, 42, and 44 indicate transmitter circuits, and reference numerals 32, 34, and 46 indicate receiver circuits. Reference numerals 38 and 48 indicate wakeup detection circuits.

The host-side transmitter circuit 42 current-drives differential strobe signals STB+/−. The client-side receiver circuit 32 amplifies the voltage across a resistor RT1 generated by current-driving the differential strobe signals STB+/−, and outputs a strobe signal STB_C to a circuit in the subsequent stage. The host-side transmitter circuit 44 current-drives data strobe signals DATA+/−. The client-side receiver circuit 34 amplifies the voltage across a resistor RT2 generated by current-driving the data strobe signals DATA+/−, and outputs a data signal DATA_C_HC to a circuit in the subsequent stage.

Figure 10A:
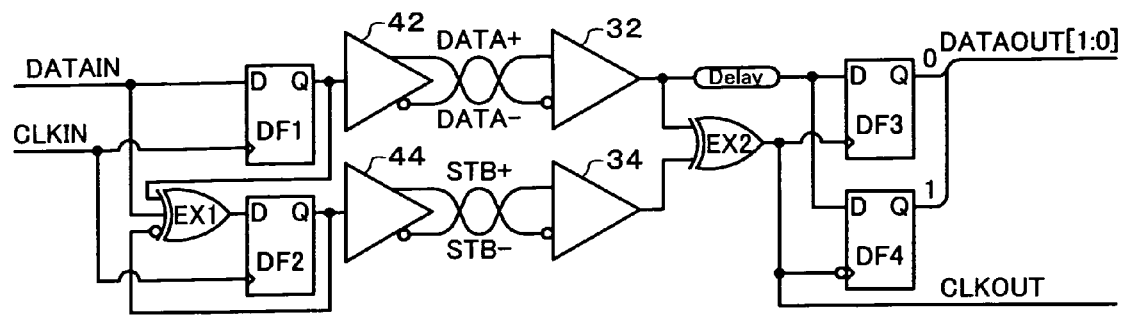
FIGS. 10A and 10B are illustrative of a strobe signal.
Figure 10B:
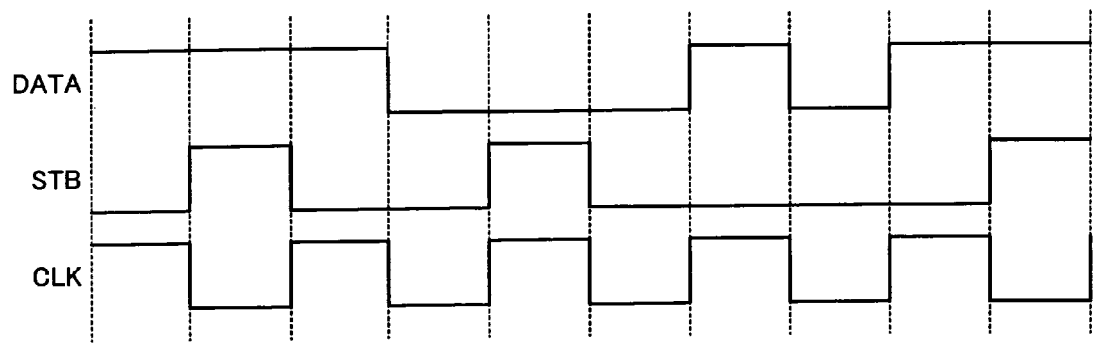

The conversion from the clock signal to the strobe signal and the conversion from the strobe signal to the clock signal may be realized by a circuit shown in FIG. 10A. As shown in FIG. 10B, the transmitter side generates the strobe signal STB by calculating the exclusive OR between a data signal DATA and a clock signal CLK, and transmits the strobe signal STB to the receiver side through the high-speed serial bus. The receiver side calculates the exclusive OR between the data signal DATA and the strobe signal STB to reproduce the clock signal CLK. This reduces the number of transitions of the strobe signal STB in comparison with the clock signal CLK, as is clear from FIG. 10B, whereby the noise immunity of data transfer can be increased.

The configuration of the transceiver is not limited to the configuration described with reference to FIGS. 9 to 10B. For example, a configuration as shown in FIG. 11 may also be used.

Figure 11:
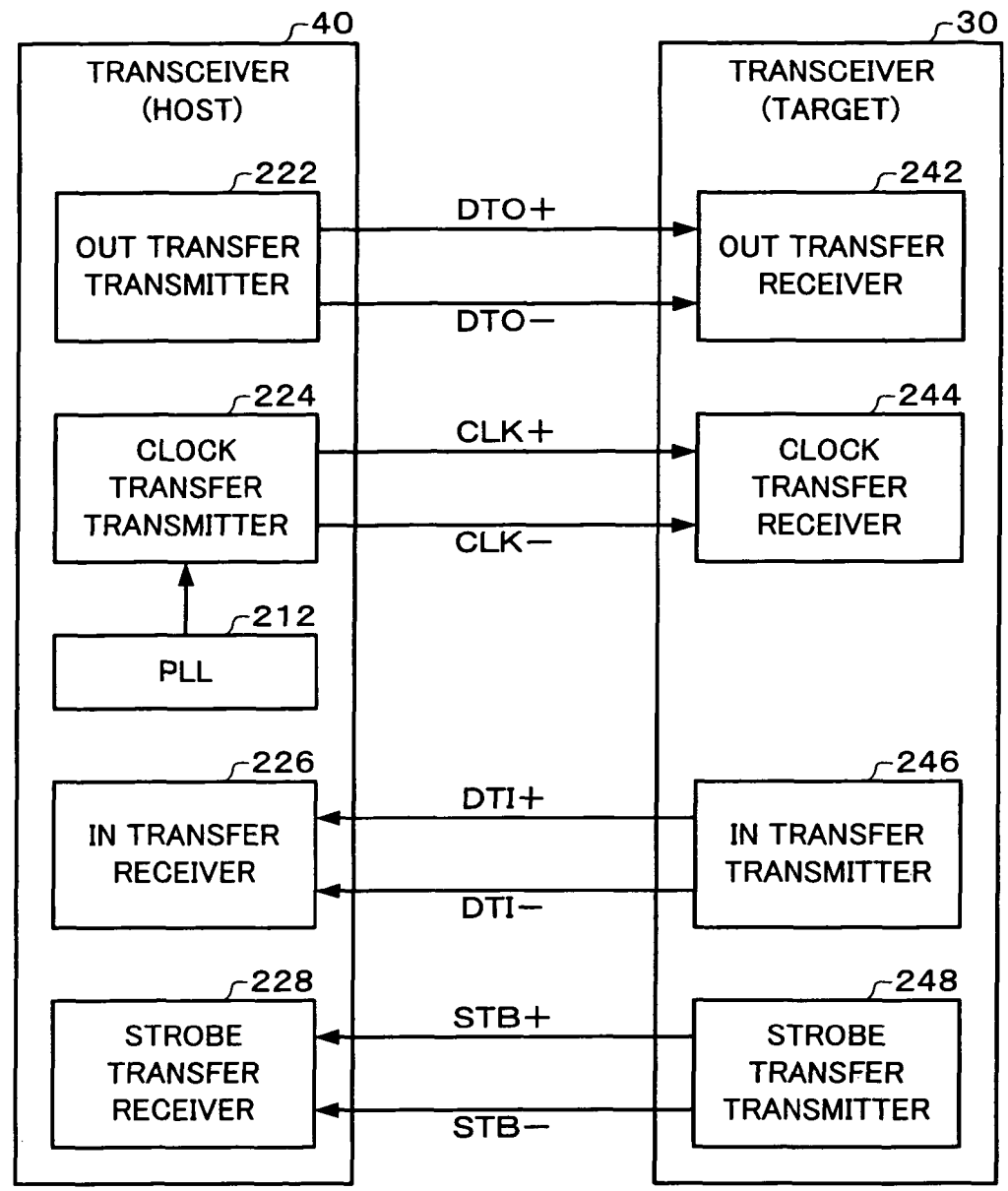
FIG. 11 is another configuration example of the transceiver.

In FIG. 11, DTO+ and DTO− indicate differential data signals (OUT data) output from the host to the target. CLK+ and CLK− indicate differential clock signals supplied from the host to the target. The host outputs the differential data signals DTO+/− in synchronization with the edge of the clock signals CLK+/−. Therefore, the target can sample and store the differential data signals DTO+/− using the clock signals CLK+/−. In FIG. 11, the target operates based on the clock signals CLK+/− supplied from the host. Specifically, the clock signals CLK+/− serve as a system clock signal of the target. Therefore, a PLL circuit 212 is provided in the host and is not provided in the target.

DTI+ and DTI− indicate differential data signals (IN data) output from the target to the host. STB+ and STB− indicate differential strobe signals supplied from the target to the host. The target generates and outputs the differential strobe signals STB+/− based on the clock signals CLK+/− supplied from the host. The target outputs the differential data signals DTI+/− in synchronization with the edge of the differential strobe signals STB+/−. Therefore, the host can sample and store the differential data signals DTI+/− using the differential strobe signals STB+/−.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention. Any term (such as parameter or display data) cited with a different term having broader or the same meaning (such as data) at least once in this specification and drawings can be replaced by the different term in any place in this specification and drawings.

The configurations and the operations of the display driver and the electronic instrument are not limited to the configurations and the operations described in the embodiments of the invention. Various modifications and variations may be made. The method of adjusting the difference in transfer rate between the high-speed serial bus and the low-speed serial bus, the method of setting the dummy data, the method of classifying the output destination of the command or data, and the like are not limited to the methods described in the embodiments of the invention.

What is claimed is:

1. A display driver comprising:
    a high-speed serial interface circuit that receives a packet from a host device through a high-speed serial bus using differential signals, and outputs a command or data included in the packet;
    a driver circuit that drives a main display panel based on the command or the data output from the high-speed serial interface circuit, the driver circuit having a driver section that generates a data line voltage and outputs the data line voltage to data lines of the main display panel; and
    a low-speed serial interface circuit that outputs a sub display driver command or a sub display driver data to a sub display driver through a low-speed serial bus when the packet received from the host device includes the sub display driver command or the sub display driver data, a transfer rate of the low-speed serial bus being lower than a transfer rata of the high-speed serial bus,
    the high-speed serial bus being a differential signal bus using the differential signals, and the amplitude of the differential signals of the high-speed serial bus being lower than the amplitude of a signal of the low-speed serial bus,
    the high-speed serial interface circuit being connected with the host device through the high-speed serial bus and being connected with the driver circuit,
    the driver circuit being connected with the main display panel and being connected with the low-speed serial interface circuit,
    the low-speed serial interface circuit being connected with the sub-display driver through the low-speed serial bus,
    when the packet received from the host device through the high-speed serial bus includes a main display driver command or a main display driver data, the main display driver command or the main display driver data being input to the driver circuit from the high-speed serial interface circuit,
    when the packet received from the host device through the high-speed serial bus includes the sub display driver command or the sub display driver data, the sub display driver command or the sub display driver data being input to the low-speed serial interlace circuit directly from the high-speed serial interface circuit or from the high-speed serial interface circuit through the driver circuit, and
    the low-speed serial interlace circuit outputting the sub display driver command or the sub display driver data to the sub display driver through the low-speed serial bus.

2. The display driver as defined in claim 1,
    the high-speed serial interface circuit receiving the packet in which the sub display driver data and transfer rate adjustment dummy data are set in a data field,
    the low-speed serial interlace circuit outputting the sub display driver data to the sub display driver among the sub display driver data and the dummy data set in the data field of the packet, and
    the transfer rate adjustment dummy data adjusting difference in transfer rate between the high-speed serial bus and the low-speed serial bus.

3. The display driver as defined in claim 2,
    when the transfer rate of the high-speed serial bus is indicated by VH and the transfer rate of the low-speed serial bus is indicated by VL, a number of bytes of the dummy data being increased as a ratio "VL/VH" becomes smaller.

4. The display driver as defined in claim 2, further comprising:
    an extraction circuit that extracts the sub display driver data among the sub display driver data and the dummy data set in the data field of the packet to adjust difference in transfer rate between the high-speed serial bus and the low-speed serial bus.

5. The display driver as defined in claim 1,
    the high-speed serial interface circuit receiving the packet in which the sub display driver command is set in a header field, and
    the low-speed serial interface circuit outputting the sub display driver command set in the header field of the packet to the sub display driver.

6. The display driver as defined in claim 2,
    the high-speed serial interface circuit receiving the packet in which the sub display driver command is set in a header field, and
    the low-speed serial interface circuit outputting the sub display driver command set in the header field of the packet to the sub display driver.

7. The display driver as defined in claim 1,
the high-speed serial interface circuit receiving the packet including destination information for designating a destination of the command or the data from the host device and
when the sub display driver has been designated as the destination by the destination information, the low-speed serial interface circuit outputting the command or the data from the high-speed serial interface circuit to the sub display driver as the sub display driver command or data.

8. The display driver as defined in claim 2,
the high-speed serial interface circuit receiving the packet including destination information for designating a destination of the command or the data from the host device, and
when the sub display driver has been designated as the destination by the destination information, the low-speed serial interface circuit outputting the command or the data from the high-speed serial interface circuit to the sub display driver as the sub display driver command or data.

9. The display driver as defined in claim 1, comprising:
a command register into which the command included in the received packet is written, and
when a command which enables output of the command or the data to the sub display driver has been written into the command register, the low-speed serial interface circuit outputs the command or the data from the high-speed serial interface circuit to the sub display driver as the sub display driver command or data.

10. The display driver as defined in claim 2, comprising:
a command register into which the command included in the received packet is written, and
when a command which enables output of the command or the data to the sub display driver has been written into the command register, the low-speed serial interface circuit outputs the command or the data from the high-speed serial interface circuit to the sub display driver as the sub display driver command or data.

11. The display driver as defined in claim 1,
the high-speed serial interface circuit outputting host interface signals including a signal of the command or the data included in the packet as a parallel data signal, and
the driver circuit including:
a host interface circuit that receives the host interface signals from the high-speed serial interface circuit and outputs the parallel data signal included in the host interface signals; and
an output switch circuit that receives the parallel data signal from the host interface circuit and outputs the parallel data signals to one of an internal circuit of the driver circuit and the low-speed serial interface circuit.

12. The display driver as defined in claim 11,
the high-speed serial interface circuit including the chip select signal generation circuit that generates and outputs a second chip select signal separately from a first chip select signal included in the host interface signals, and
the output switch circuit outputting the parallel data signal from the host interface circuit to one of the internal circuit of the driver circuit and the low-speed serial interface circuit based on the second chip select signal.

13. The display driver as defined in claim 1,
the high-speed serial interface circuit outputting a signal of the command or the data included in the received packet to the driver circuit as a parallel data signal, and the low-speed serial interface circuit including a parallel/serial conversion circuit that converts the parallel data signal to a serial data signal.

14. The display driver as defined in claim 1,
the high-speed serial interface circuit receiving differential strobe signals or differential clock signals from the host device as the differential signals, and
the low-speed serial interface circuit outputting the sub display driver command or data to the sub display driver based on a clock signal generated by dividing a frequency of a clock signal obtained by the differential strobe signals or the differential clock signals.

15. The display driver as defined in claim 1,
the low-speed serial interface circuit outputting command/data identification information for identifying the command or the data to the sub display driver while associating the command/data identification information with the sub display driver command or data.

16. The display driver as defined in claim 1,
the high-speed serial bus being a serial bus using low amplitude differential signals, and
the low-speed serial bus being a serial bus using a signal at a CMOS voltage level.

17. The display driver as defined in claim 2,
the high-speed serial bus being a serial bus using low amplitude differential signals, and
the low-speed serial bus being a serial bus using a signal at a CMOS voltage level.

18. An electronic instrument comprising:
the display driver as defined in claim 1;
the host device connected with the display driver through the high-speed serial bus;
the main display panel driven by the display driver; and
the sub display driver connected with the display driver through the low-speed serial bus.

19. An electronic instrument comprising:
the display driver as defined in claim 2;
the host device connected with the display driver through the high-speed serial bus;
the main display panel driven by the display driver; and
the sub display driver connected with the display driver through the low-speed serial bus.

20. An electronic instrument comprising:
the display driver as defined in claim 5;
the host device connected with the display driver through the high-speed serial bus;
the main display panel driven by the display driver; and
the sub display driver connected with the display driver through the low-speed serial bus.

21. The display driver as defined in claim 1,
the main display panel and the sub display panel being panels mounted in the same electronic instrument.

22. The display driver as defined in claim 1,
the host device being mounted in a first instrument section of an electronic instrument,
the display driver, the main display panel and the sub display panel being mounted in a second instrument section of the electronic instrument, and
the high-speed serial bus being provided in a connection section that connects the first instrument section and the second instrument section of the electronic instrument.

23. The display driver as defined in claim 1,
the high-speed serial interface circuit receiving a video stream packet from the host device through the high-speed serial bus when the driver circuit drives the main display panel, the high-speed serial interface circuit receiving a sub display driver packet from the host device through the high-speed serial bus when the sub display driver drives the sub display panel, video stream data being set in a data field of the video stream packet, the sub display driver data and transfer rate adjustment dummy data being set in a data field of the sub display driver packet, and the transfer rate adjustment dummy data adjusting difference in transfer rate between the high-speed serial bus and the low-speed serial bus.

24. The display driver as defined in claim 23, the high-speed serial interface circuit extracting the sub display driver command set in a header field of the sub display driver packet, and the high-speed serial interface circuit extracting the sub display driver data among the sub display driver data and the transfer rate adjustment dummy data set in the data field of the sub display driver packet.

25. The display driver as defined in claim 24, the high-speed serial interface circuit outputting the sub display driver command, the sub display driver data and a write signal to the driver circuit, the sub display driver command and the sub display driver data being output as parallel data, the write signal directing writing the parallel data, and the write signal being activated at a time interval increased by the transfer rate adjustment dummy data.

\* \* \* \* \*